United States Patent [19]
Lisson et al.

[11] Patent Number: 5,902,994
[45] Date of Patent: May 11, 1999

[54] APPARATUS FOR CALIBRATING A LINEAR IMAGE SENSOR

[75] Inventors: Jerold B. Lisson, Henrietta; Kenneth L. Mason, Pittsford; Thomas W. Dey, Springwater, all of N.Y.

[73] Assignee: Eastman Kodak Company, Rochester, N.Y.

[21] Appl. No.: 08/851,907

[22] Filed: May 6, 1997

[51] Int. Cl.⁶ .................................................. H04N 1/40
[52] U.S. Cl. ...................... 250/208.1; 250/205; 356/318; 358/482
[58] Field of Search ................................ 250/208.1, 205, 250/234–236; 356/218; 358/475, 471, 482

[56] References Cited

U.S. PATENT DOCUMENTS 4,585,934  4/1986  French et al. .
4,677,287  6/1987  Ejima ........................................ 250/205
4,870,454  9/1989  Kurusa et al. ............................. 355/69
5,278,674  1/1994  Webb et al. .............................. 358/475
5,442,464  8/1995  Ito ............................................ 358/482
5,495,329  2/1996  Anderson, II et al. .................. 356/218

*Primary Examiner*—Stephone Allen
*Attorney, Agent, or Firm*—Thomas H. Close

[57] ABSTRACT

Apparatus for calibrating a linear image sensor, includes a fluorescent light source, at least as long as the image sensor; a fixture for holding the light source parallel to the image sensor and displaced from the image sensor by a fraction of the length of the image sensor; and a light level controller for producing a plurality of light levels from the lamp.

16 Claims, 5 Drawing Sheets

APPARATUS FOR CALIBRATING A LINEAR IMAGE SENSOR

This invention was made with Government support under contract number F33657-90-C-6256 for the Department of Defense. The Government has certain rights in this invention.

FIELD OF THE INVENTION

The invention relates generally to the field of calibrating linear arrays of photosensors such as Charge Coupled Devices (CCD) or Charge injection Devices (CID).

BACKGROUND OF THE INVENTION

The response of pixels in linear image detectors such as focal plane arrays typically may vary in a random fashion by ±15%. This severely limits the fidelity of the recorded image. To improve the fidelity of an image produced by such sensors, it is common to calibrate the image sensor by illuminating the image sensor with a controlled source of uniform illumination and record the responses of the individual pixels in the sensor. For maximal fidelity, each pixel must respond identically to equal luminance levels. It is the function of light calibrators to ensure an equalization of pixel response to equal input (amplitude and spectral) The calibrator inputs known amounts of radiation energy into each pixel or detector element and its response to such input recorded. This is done for a range of calibrator controlled input radiation levels from zero to some maximal radiation level. The pixel response measured and recorded in terms of offset (bias) and gain (slope). These results are stored in a memory and subsequently are used to adjust pixel response in absolute and relative terms.

Current calibrators commonly use incandescent radiation (light) sources as the active element of the calibrator. Such sources have the following disadvantages:

1. The spectral characteristics of incandescent light sources are rich in the red part of the light spectra and thus are inherently poor simulators of sunlit objects which are common in the photographic process.
2. Light output from an incandescent light source is specular and generally exhibits illumination hot spots, due for example to filament irregularity and shadowing, which result in a non-uniform illumination.
3. The spectral output from incandescent lamps changes as a function of input current supplied to the filament and hence exhibit strong variations in the characteristics of the output light spectra with changes in light output level. Furthermore, the spectral output of incandescent lamps changes over time at a given output level due to evaporation and deposition of the filament material onto the lamp envelope.
4. Incandescent light sources are compact and thereby require large separation from the image sensor or complex optical projection systems that spread the light to insure coverage.

SUMMARY OF THE INVENTION

The present invention is directed to overcoming one or more of the problems set forth above. Briefly summarized, according to one aspect of the present invention, apparatus for calibrating a linear image sensor, includes a fluorescent light source, at least as long as the image sensor; a fixture for holding the light source parallel to the image sensor and displaced from the image sensor by a fraction of the length of the image sensor; and a light level controller for producing a plurality of light levels from the lamp.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

In contrast to the conventional incandescent based calibration system, the calibration apparatus of the present invention provides the following advantages:

1. A wideband spectra equivalent to that supplied by natural daylight due to the ability to provide a phosphor mixture tailored to the spectral requirements of the sensor.
2. The fluorescent light source is capable of providing a long uniform, diffuse light source such as is required for coverage of long linear image sensors.
3. Stable light level control (relatively invariant spectral distribution with change in illuminance level). Electronic light level control is thus enabled.
4. Superior life and reliability characteristics.
5. The light output is essentially Lambertian and ripple free, being generated from phosphor excitation and hence inherently diffuse in character.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
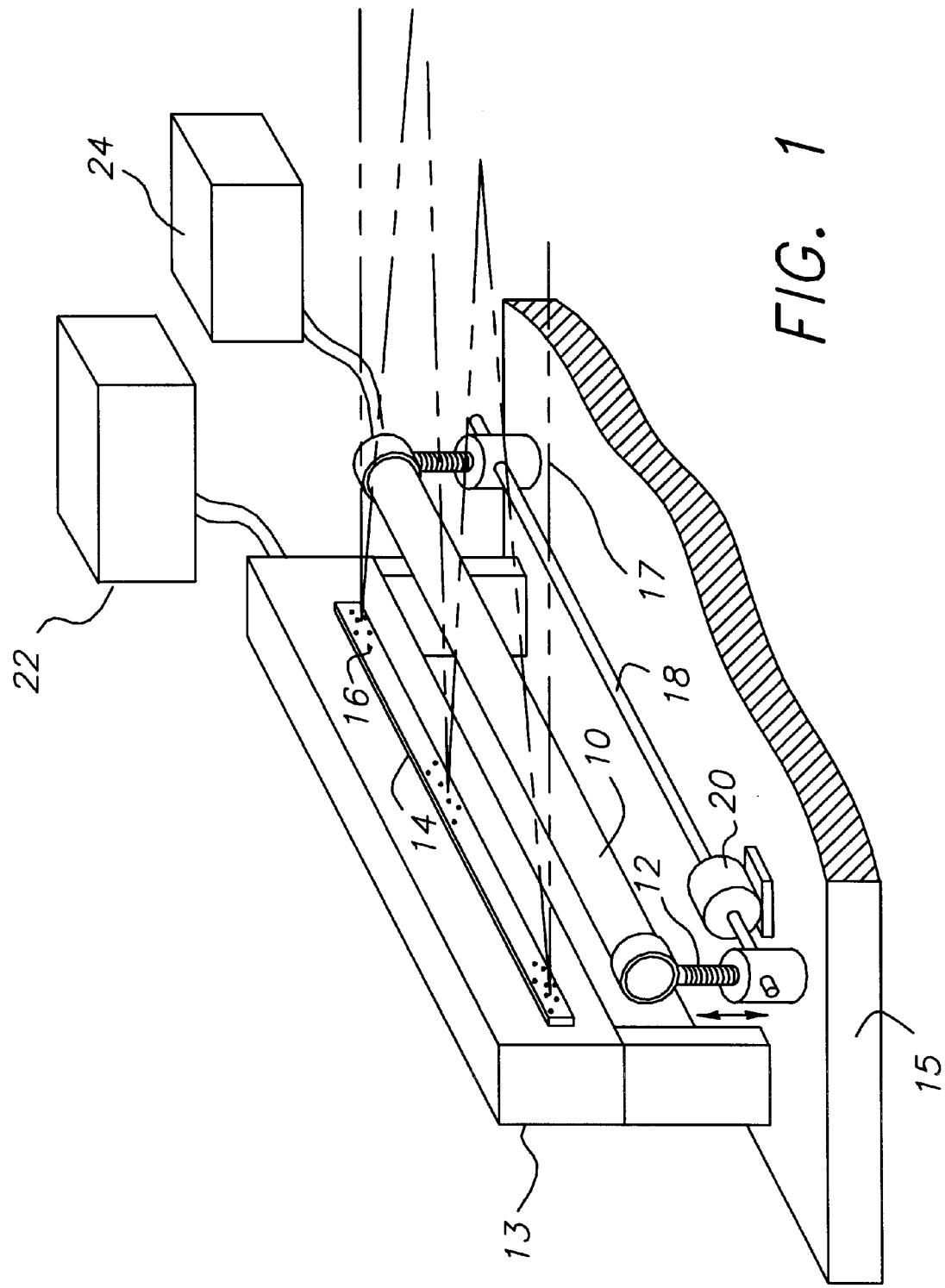
FIG. 1 is a schematic perspective view illustrating the calibration apparatus of the present invention.

Beginning with FIG. 1, the calibration apparatus according to the present invention includes a fluorescent light source 10 held in a fixture 12 parallel to and spaced apart from a linear image sensor 14. The image sensor 14 is similarly held in a fixture 13 and both fixtures 12 and 13 are attached to a common base 15. The linear image sensor 14 may be of the type having one or more lines of pixels 16 that are employed in optical apparatus such as a scanning camera. The calibration apparatus of the present invention may be built into an optical instrument forming an imaging beam 17 onto image sensor 14. A drive mechanism 18 includes a motor 20 for moving the light source 10 in front of and away from the image sensor 14. The drive mechanism 18 may comprise, for example, a double rack and pinion, or ball and lead screw arrangement.

The image sensor 14 is driven by control electronics 22 that supply clocking signals to the image sensor and process the image signal produced by the sensor in a known manner. The light source 10 is driven by control electronics 24 that controls the intensity of the light source. Control electronics 24 may include, for example a microprocessor and an electronic dimmer controlled by the microprocessor.

A suitable fluorescent light source is a G.E. Chroma 50 fluorescent lamp available from the General Electric Company, Nela Park, Ohio, in a size that is at least as long as the image sensor itself.

In operation, the light source 10 is positioned in front of the image sensor 14 and a stepwise series of voltages are applied to the light source to produce several levels for illumination. The image sensor 14 is actuated at each illumination level and the resulting images are captured and stored. The captured images are processed in a known manner to determine the gains and offsets for each pixel element that will normalize the responses of the pixels.

Figure 2:
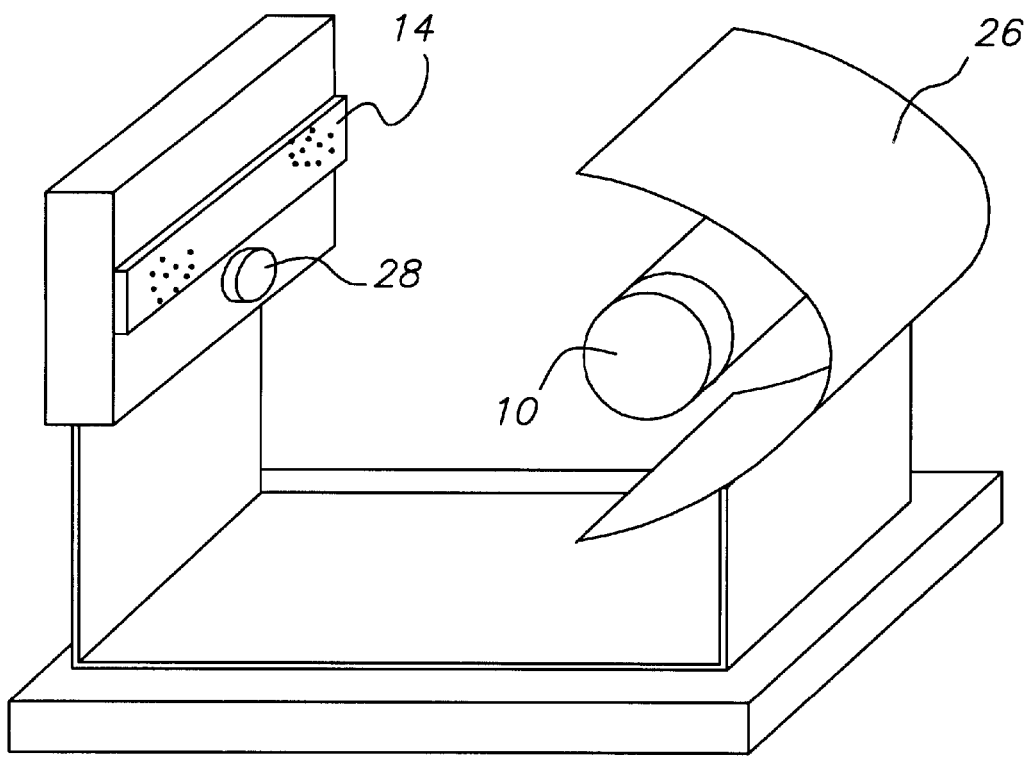
FIG. 2 is a schematic perspective view of the calibration apparatus including a reflector associated with the light source.

As shown in FIG. 2, the output of the fluorescent light source 10 may be maximized by a linear reflector 26. The light source 10 is located at the focal line of linear reflector 26, which may be, for example, generally parabolic or ellipsoidal in cross section.

According to one embodiment, the calibration apparatus includes a photosensor 28 located to receive light from the light source 10 and provide a feed back signal to control electronics 22. Preferably photosensor 28 is a calibrated photodiode designed to have long term stability. Control electronics 22 compares the sensed light output magnitude to the desired calibration level and adjusts light output to the desired level. Control electronics 22 is programmed to supply a series of predetermined signals (voltage or current) levels that step light controller 24 through a series of operations which supply appropriate electrical control signals (voltage or current) levels which provide light level magnitudes corresponding to said signals. The control electronics 22 is programmed to provide a sequence of illuminance levels ranging from zero amplitude to some maximum level (e.g. the level at which image sensor 14 reaches saturation).

Figure 3:
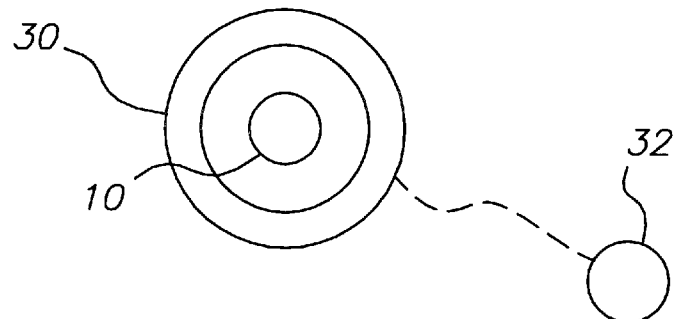
FIG. 3 is a schematic end view illustrating a cylindrical apodizing filter around the light source.
Figure 4:
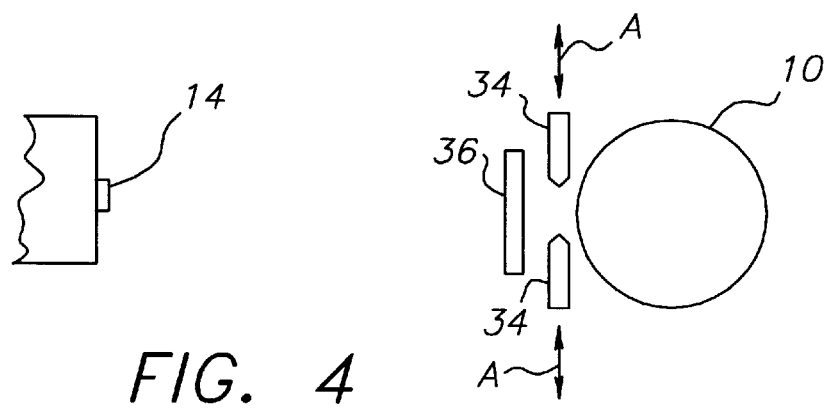
FIG. 4 is a schematic end view illustrating a slit for modulating the output of the light source.
Figure 5:
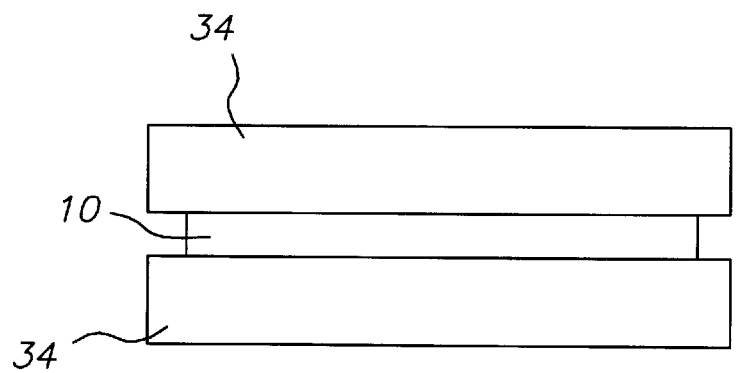
FIG. 5 is a front view of an apodizing slit useful with the apparatus of the present invention.
Figure 6:
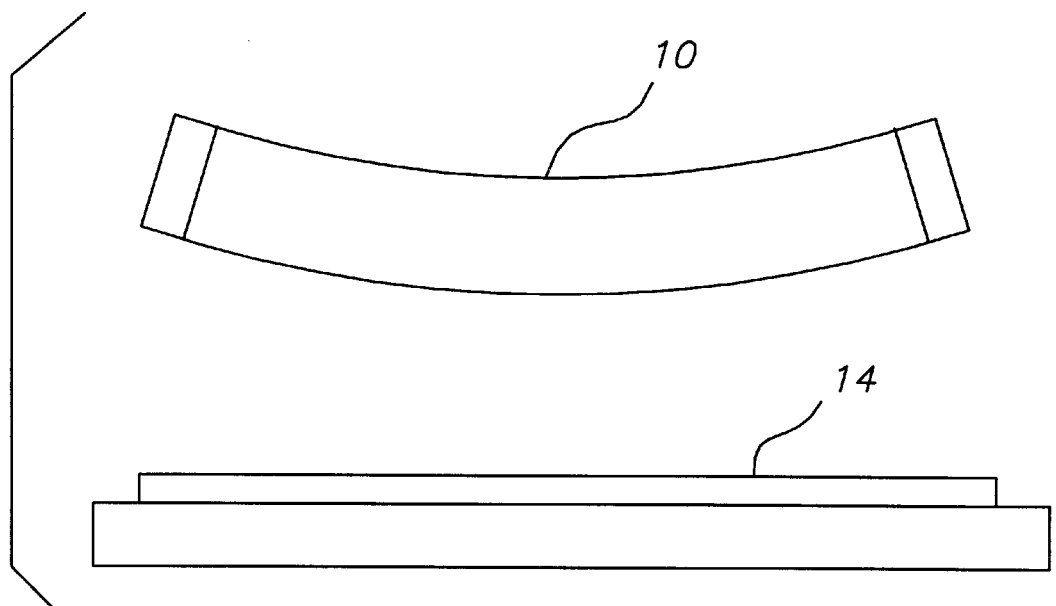
FIG. 6 is a top view illustrating a curved light source for apodizing the light output therefrom.

Referring to FIG. 3, alternatively, the light output may be controlled by a variable density filter, such as a transparent tube 30 surrounding the light source 10. The tube 30 is provided with a variable optical density around its circumference. A motor 32 is employed to rotate the tube 30 to vary the output of the light source 10. Alternatively, as shown in FIG. 4, the light output may be controlled by a variable slit 34 that can be opened and closed in the direction of Arrows A to control the intensity of light from light source 10. As shown in FIG. 5, the slit may have a tapered width to apodize the output of light source 10 to match the illumination characteristics of an optical system (not shown) associated with the image sensor 14. Alternatively, as shown in FIG. 6 the fluorescent light source may comprise a single fluorescent lamp 10 that is bowed to produce an apodized light output on image sensor 14.

Figure 7:
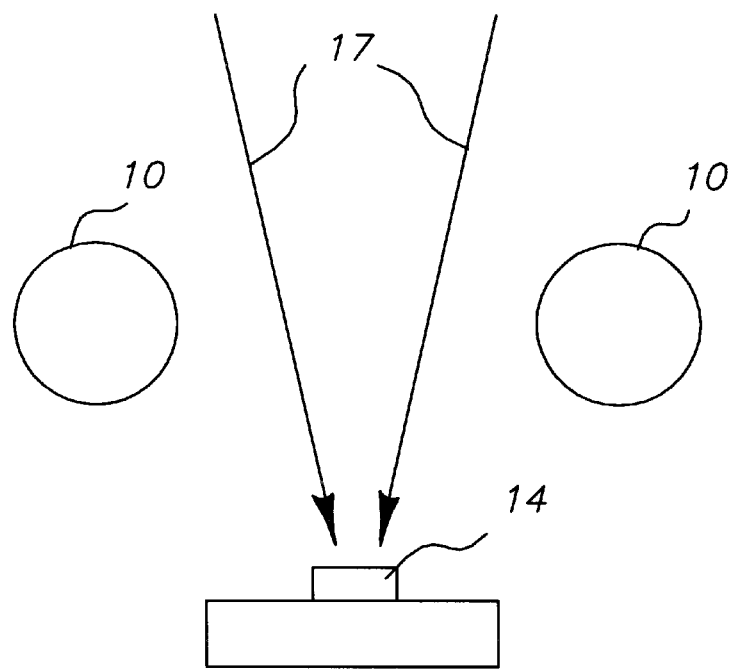
FIG. 7 is a schematic end view of a multilamp light source according to the present invention.

The fluorescent light source of the present invention may be provided by a plurality of fluorescent lamps 10 as shown in FIG. 7. The fluorescent lamps may be arranged on either side of the image forming beam 17, so that they need not be moved for calibration of the image sensor 14.

In some applications, for example, hyperspectral applications, the characteristic line spectra produced by fluorescent lamps (e.g. mercury, or argon lines) may pose a problem. In this event, a relatively simple optical notch filter 36, as shown in FIG. 4 can be used to reduce the line amplitudes to satisfactory levels.

Figure 8:
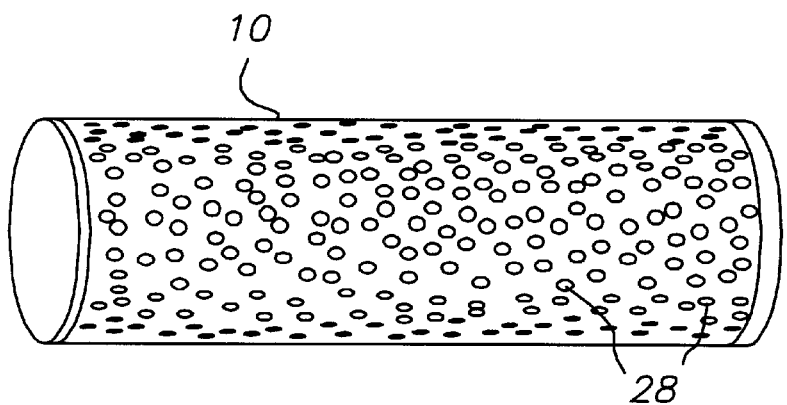
FIG. 8 is a schematic diagram illustrating a fluorescent light source comprising spattered coating of phosphorescent paint applied to the exterior of the source envelope.

Referring to FIG. 8, the spectral output of a standard fluorescent lamp may be further tailored by applying a coating to the external surface of the lamp. In one example, a lamp having a severe deficiency of red in the output spectrum was successfully adjusted by applying a spattered coating 38 of pink phosphorescent paint to the outside of the lamp.

Figure 9:
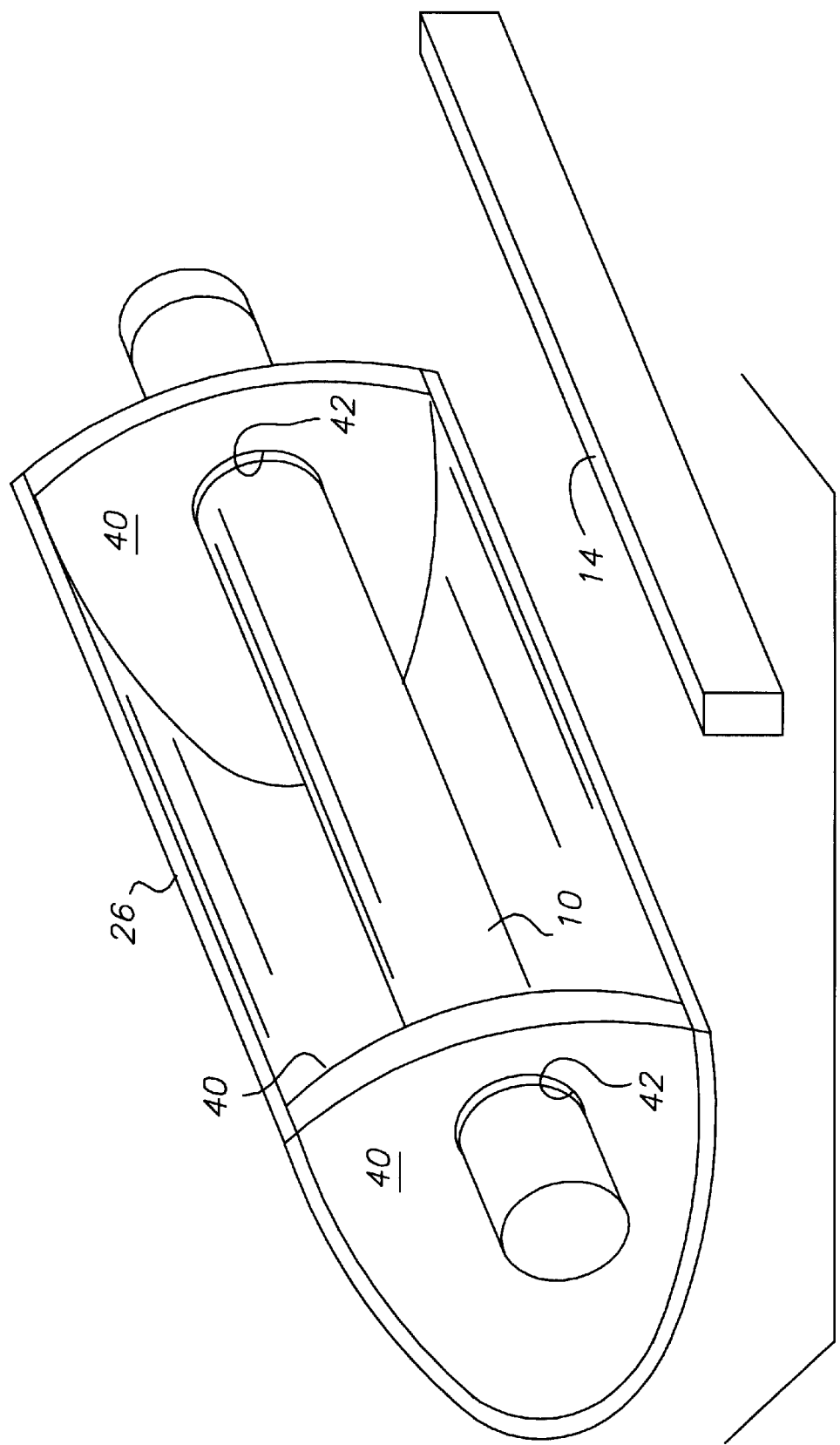
FIG. 9 is a perspective schematic showing the apparatus of FIG. 2 further including flat mirrors located near the ends of the light source.

As shown in FIG. 9, a pair of flat mirrors 40 may be positioned near the ends of the fluorescent light source 10 and oriented perpendicular to its axis. The mirrors 40 cause the source 10 and reflector 26 to appear to be infinitely long, as seen from the detector array 14, thus preventing illumination fall-off near the array ends. This desirable condition is best satisfied if the source 10 passes through clearance holes 42 in the flat mirrors 40 and the reflector 26 extends to the planes of the flat mirrors 40. The spacing between the mirrors 40 should exceed the length of the detector array 14.

The invention has been described with reference to a preferred embodiment. However, it will be appreciated that variations and modifications can be effected by a person of ordinary skill in the art without departing from the scope of the invention.

PARTS LIST 10 fluorescent light source
12 fixture
13 fixture
14 linear image sensor
15 base
16 pixels
17 imaging beam
18 drive mechanism
20 motor
22 image sensor control electronics
24 light source control electronics
26 linear reflector
28 photo sensor
30 variable filter tube
32 motor
34 variable slit
36 optical notch filter
38 spattered coating
40 flat mirrors
42 clearance holes

We claim:

1. Apparatus for calibrating a linear image sensor having a plurality of pixel elements, comprising:
   a) a fluorescent light source, at least as long as the image sensor;
   b) a fixture for holding the lamp parallel to the image sensor and displaced from the image sensor by a fraction of the length of the image sensor to illuminate the image sensor;

c) means for producing a plurality of light levels from the lamp; and d) means for capturing an image of the light source at each light level and for processing the captured images to determine the gains and offsets for each pixel element that will normalize the responses of the pixel elements.

2. The apparatus claimed in claim 1, wherein the means for producing a plurality of light levels is a variable density filter.

3. The apparatus claimed in claim 1, wherein the means for producing a plurality of light levels is a variable aperture.

4. The apparatus claimed in claim 1, wherein the image sensor is located in an optical instrument and further comprising means for moving the calibration light source in front of and away from the image sensor.

5. The apparatus claimed in claim 1, further comprising a pair of end mirrors located at the ends of the fluorescent light source to optimize the illumination uniformity over the image sensor.

6. The apparatus claimed in claim 1, wherein the means for producing a plurality of light levels is an electronic dimmer connected to the fluorescent light source for controlling the light output of the fluorescent light source.

7. The apparatus claimed in claim 6, further comprising a precalibrated photosensor arranged to detect the output of the fluorescent light source and to provide a feedback correction signal for use by the electronic dimmer to control the output intensity of the light source.

8. The apparatus claimed in claim 1, wherein the fluorescent light source comprises a plurality of fluorescent lamps.

9. The apparatus claimed in claim 8, wherein the image sensor is located in an optical instrument defining an image forming beam and the light source comprises two lamps, located on either side of the image forming beam.

10. The apparatus claimed in claim 1, wherein the light output of the fluorescent light source approximates daylight.

11. The apparatus claimed in claim 10 wherein the fluorescent light source comprises an ordinary fluorescent lamp having an external phosphor coating effective to tailor the light output of the lamp towards daylight.

12. The apparatus claimed in claim 11, wherein the external phosphor coating is applied as a homogeneous array of spots.

13. The apparatus claimed in claim 1, further comprising means for apodizing the light output from the fluorescent light source to match the cosine dependent fall off of illumination through an optical system.

14. The apparatus claimed in claim 13, wherein the fluorescent light source is a fluorescent lamp and the means for apodizing the light source is a bow in the lamp.

15. The apparatus claimed in claim 13, wherein the means for apodizing the light source is an apodizing filter.

16. The apparatus claimed in claim 13, wherein the means for apodizing the light source is an apodizing slit.

\* \* \* \* \*